Patented Jan. 8, 1929.

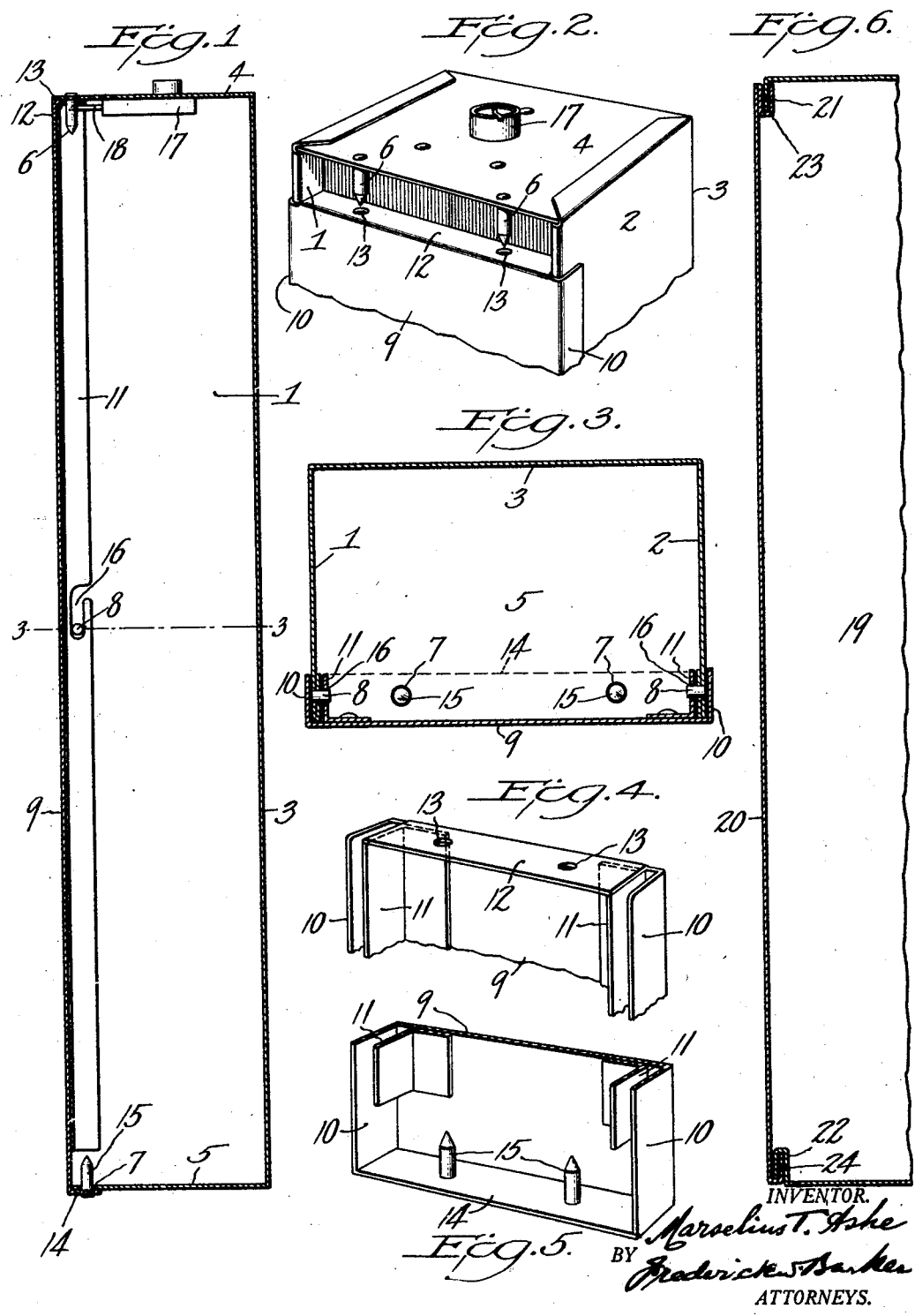

1,698,252

UNITED STATES PATENT OFFICE.

MARSELIUS T. ASHE, OF BROOKLYN, NEW YORK.

INCLOSURE.

Application filed March 12, 1927. Serial No. 174,840.

This invention relates to inclosures or casings such for example as are used for vending machines or other containers, and my improvements are directed to certain novel and useful means whereby a casing member and its cover member may be conveniently assembled and disassembled, said casing and cover members being provided with interengaging elements for the purpose of uniting said members in their interfitted or assembled relation.

Other features and advantages of my invention will hereinafter appear.

In the drawing:

Figure 1 is a side sectional elevation of my improved casing and cover therefor as assembled.

Fig. 2 is a partial top view thereof in perspective.

Fig. 3 is a section on the line 3—3 of Fig. 1.

Fig. 4 is a partial top view of the cover member, in perspective.

Fig. 5 is a partial bottom view of the cover member, in perspective, and

Fig. 6 is a partial side sectional elevation of a modification.

In Figs. 1 to 5 I have shown a rectangular casing having the sides 1, 2, back 3, top 4 and bottom 5, the front of the casing being open for the introduction and removal of articles and devices (not shown) to be contained within the inclosure.

The casing top 4 is provided near its forward edge with one or more downwardly projected studs 6, and the bottom 5 is provided, also near its forward edges, with one or more holes 7. In addition, the casing sides 1 and 2 are each provided, near their forward edges, with inwardly projected horizontal studs 8.

The cover member which is adapted to close the open front of the casing is here shown as comprising a plate 9 having narrow double walls at each side thereof, said double walls consisting of an outer wall 10 and an inner wall 11, these walls 10, 11 being in spaced relation to embrace between them the forward edge portion of a casing wall. Thus, in fitting the cover member to the casing member the double walls at the respective sides of the cover member engage the corresponding forward edge portions of the casing walls 1 and 2.

The upper ends of inner walls 11 are connected by top 12, which is provided with holes 13 for the reception of the studs 6; and the lower ends of outer walls 10 are connected by a base 14, which is provided with upwardly projecting studs 15 to engage the holes 7. The clearances between the double walls of the cover member are left open at top and bottom, and the inner walls 11 extend downwardly only to a horizontal plane that is clearingly above the tops of studs 15, so that the bottom 5 of the casing member may pass between the tops of said studs and the lower edges of inner walls 11 in fitting the cover and casing members together. Also the inner walls 11 of the cover member are provided with bayonet slots 16 for the reception and lodgement of the studs 8.

Now it will be appreciated that with the fastening instrumentalities referred to the cover member is to be applied to the casing member, to close the latter, in the manner indicated in Fig. 2, wherein it is shown that the cover top 12 is placed below the studs 6, in position for said studs to enter holes 13. In this position the double walls of the cover member will slidably embrace the forward edges of the casing walls 1, 2, and the base 14 of the cover member will be spaced below the casing bottom 5 with its studs 15 aligned with holes 7. Then upon sliding the cover member upwardly with relation to the casing member, studs 6 will engage holes 13 and studs 15 will engage holes 7. When the cover and casing members are brought together in the manner described the studs 8 enter their slots 16 and become lodged in said slots as said members are slidably united by their respective studs and holes.

By the engaging means shown and described the casing and cover members become sturdily connected in their interfitted relation at top, bottom and intermediate parts thereof. A lock 17 indicated as carried by the casing member top 4, is provided with a bolt 18 that can be projected beneath the cover member top 12, to thereby secure these members against detachment.

In the modification of Fig. 6 I have shown other means of connection between a casing member and a cover member.

The casing member is here indicated at 19 and the cover member at 20. Said casing member is provided at its open front with the flange 21 bent downwardly from its top, and with the inverted U-shaped channel formation 22 that extends upwardly from its base. The cover member is provided at its upper end with the U-shaped formation 23 that is adapted to receive and seat the flange 21, and at its bottom with an inner, upwardly turned flange 24 adapted to enter and become seated in the channel formation 22. With these upper and lower complementary formations respectively upon the casing and cover members they may be interfitted and disconnected by vertically slidable action, one upon the other.

It will be appreciated that while I have by way of example illustrated and described a casing with an open front side and a cover therefor, my improved connecting means are equally applicable where the closure means are used with any side of the casing.

Variations within the spirit and scope of my said invention are equally comprehended by the foregoing disclosure.

I claim:

1. The combination with a casing having an open side and a cover therefor, of doubled walls angled from opposite sides of said cover, said doubled walls each having an intermediate clearance to slidably embrace the forward portion of a casing wall, and inturned end portions upon said cover, opposed end portions of the casing and the inturned end portions of the cover having aligned interengaging means to co-act in the relative slidable movement between the casing and cover.

2. The combination with a casing having an open side and a cover therefor having upper and lower inturned flanges, said flanges being in opposed relation respectively with opposite end walls of said casing, said flanges provided respectively with holes and studs and the opposite end walls of the casing being provided respectively with studs and holes, the studs on the casing end wall being engageable with the holes in the flange of the cover opposed thereto, and the holes in the casing end wall being engageable with the studs on the cover of the flange opposed thereto.

3. The combination with a casing having an open side and a cover therefor, of doubled walls comprising inner and outer walls angled from opposite sides of said cover, said doubled walls each having an intermediate clearance to slidably embrace the forward portion of a casing wall, inturned end portions upon said cover, opposed end and intermediate portions of the casing walls and the inturned ends and intermediate portions of the cover inner wall having interengaging means to co-act in the relative slidable movement between the casing and cover.

New York, February 10th, 1927.

MARSELIUS T. ASHE.